United States Patent [19]
Smith et al.

[11] Patent Number: 5,748,672
[45] Date of Patent: May 5, 1998

[54] SYSTEM FOR MEASURING JITTER IN A NON-BINARY DIGITAL SIGNAL

[75] Inventors: Marc L. Smith, Sterling; Fadi H. Daou, Milton, both of Mass.

[73] Assignee: CenRad, Inc., Concord, Mass.

[21] Appl. No.: 514,011

[22] Filed: Aug. 11, 1995

[51] Int. Cl.$^6$ .................................................. H04B 3/46
[52] U.S. Cl. .................. 375/226; 371/1; 364/715.06; 364/732
[58] Field of Search ................ 375/226, 244, 375/371, 376; 371/1; 364/715.06, 732

[56] References Cited

U.S. PATENT DOCUMENTS

| | | | |
|---|---|---|---|
| 4,320,516 | 3/1982 | Kammerlander | 375/226 |
| 4,603,300 | 7/1986 | Well, II et al. | 375/328 |
| 4,819,197 | 4/1989 | Blais | 364/715.6 |
| 5,528,636 | 6/1996 | Sevenhans et al. | 375/371 |

*Primary Examiner*—Wellington Chin
*Assistant Examiner*—Congvan Tran
*Attorney, Agent, or Firm*—Cesari and McKenna, LLP

[57] ABSTRACT

To measure various frequency components of the jitter of the deviation of the transition times in a signal on a signal line (44) from nominal bit times, a sampler (40) samples the signal at a rate high enough to determine the transition time with the required resolution. By employing a differentiator (60), test circuitry (FIG. 3B) can detect not only zero crossings but all digital-level transitions. The timings of the maxima of the differentiator output are applied to a Fourier-transform unit (76) that computes jitter-frequency components from a resultant sequence of deviations of the maxima from nominal transition times. Although computation of the lowest jitter-frequency components is necessarily based on a sequence that extends over a correspondingly long signal record, the input of a memory (48) that receives the raw samples from which those transition-time deviations are computed is so gated that the memory (48) receives only infrequently occurring bursts of the sampler's high-sample-rate output when the lower jitter frequencies are to be measured. A memory (48) of only moderate size can therefore be employed despite the necessarily high sample rate and necessarily long record duration.

15 Claims, 4 Drawing Sheets

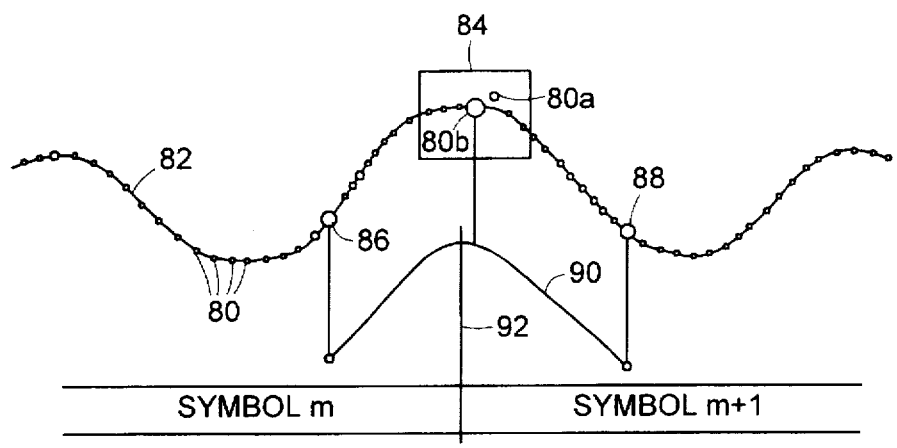
FIG. 4
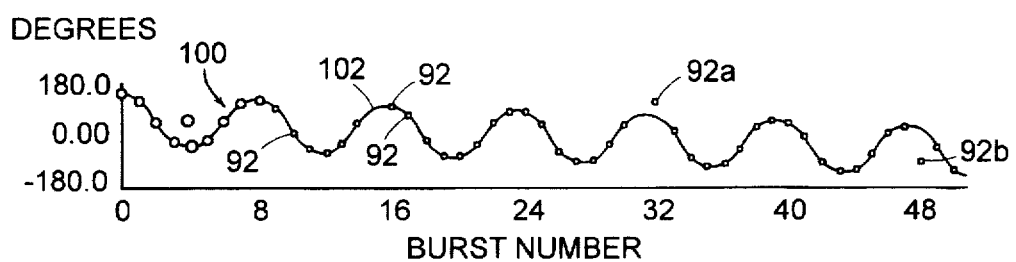
FIG. 5
| SIGNAL SAMPLES/ BURST | SYMBOLS/ BURST | SKIP-INTERVAL (SYMBOLS) (Hz) | JITTER SAMPLE RATE | NUMBER OF BURSTS PER MEASUREMENT |
|---|---|---|---|---|
| 0.15 - 39 Hz | 128 | 2 | 1022 | 78.125 Hz | 512 |
| 0.5 - 62 Hz | 255 | 4 | 636 | 125 kHz | 256 |
| 62 Hz - 8 kHz | 255 | 4 | 1 | 16 kHz | 256 |
| 78 Hz - 20 kHz | 128 | 2 | 0 | 40 kHz | 512 |
FIG. 6

SYSTEM FOR MEASURING JITTER IN A NON-BINARY DIGITAL SIGNAL

BACKGROUND OF THE INVENTION

A. Field of the Invention

This invention relates to the measurement of clock jitter in self-clocking digital data signals. More specifically, it relates to the sampling of the data signals to recover phase variations of the clock signals embedded therein.

The reception of digital data transmissions requires that the incoming signals be sampled or "strobed" at periodic, precise intervals to sense the values of the signals at those times. For example, a simple binary data signal should be sampled in the middle of each bit cell to determine whether the bit is a 1 or a 0. Obviously the sampling, which is timed by a clock signal, must be synchronized with the data signal if errors are to be minimized.

Usually self-clocking schemes are used in the transmission of data. The clock signal is, in essence, embedded in the data signal. It is recovered at the receiver to control a local clock whose output is used to strobe the incoming data signal and thereby detect the data. Thus the timing of the clock signal relative to the data signal is fixed at the transmitter and is not affected by the characteristics of the path from the transmitter to the receiver. Accordingly, if the characteristics of the transmitter or the path change, the relative clock-data timing will not change. The phase-lock-loop that controls the local clock will adjust the phase of the clock so as to preserve the proper clock timing relative to the data.

However, if the phase of the received data signal varies too rapidly, the phase-lock loop will be unable to adjust the local clock fast enough, to follow the corresponding changes in the phase of the embedded clock signal and errors in data detection will result. For this reason standards have been promulgated, governing the amount and rate of phase change ("phase jitter") that are allowed in the transmission paths. The present invention is directed to an improved system for ascertaining the phase jitter to determine compliance with the applicable standard.

B. Description of Related Art

Prior systems sense the zero crossings of the data signals to determine the phases of the embedded clock signals. However, this requires that the transitions involve zero crossings and, furthermore, that they be symmetrical with respect to the crossings. For example, with the 2B1Q format used in ISDN communications, most of the signal transitions will not meet this criterion. Systems using this ISDN format may transmit at a rate of 80,000 symbols/second, while a jitter standard for the 2B1Q format may cover jitter frequency components from 0.15 Hz to 20k Hz. Accordingly the use of zero-crossing detection to ascertain jitter magnitude will usually not provide a high enough sampling rate to measure jitter components in the mid to upper portions of this frequency range unless normal transmissions are interrupted and a predetermined pattern of symbols is transmitted.

Accordingly it is an object of the invention to provide an improved method and apparatus for measuring phase jitter in digital data signals. A more specific object of the invention is to provide accurate measurements of phase jitter in signals transmitted during normal operation of a monitored system. A further object is to provide accurate measurements of phase jitter over a wide range of jitter frequencies. Yet another object of the invention is to provide accurate measurement of phase jitter in signals propagating in either direction over a transmission line.

DESCRIPTION OF THE INVENTION

A. BRIEF SUMMARY OF THE INVENTION

In accordance with the invention we sense transitions in a data signal by differentiating the signal and using the maximum absolute value of the derivative as the timing mark for each transition. Thus, each transition is eligible for use in measuring phase jitter and the high-frequency components of the jitter are easily within the range of the measuring system.

The system operates digitally, by sampling the data signal at a relatively high rate, e.g. 64 samples/symbol and using these samples in computing the derivative. Together with a curve-fitting procedure, described below, this provides sufficient resolution in locating the derivative maxima.

The invention can also be used to measure phase jitter in signals propagating in both directions over a transmission line. For this purpose we insert a directional coupler into the transmission line. The coupler has two output ports, one for signals travelling in one direction and the other for signals travelling in the opposite direction. The jitter-measuring unit described herein can be switched between the two ports to measure the jitter for signals travelling in the respective directions.

FIG. 1 illustrates a fragment of a signal representing a sequence of symbols transmitted with the 2B1Q format. The depicted waveform is idealized in that the various transitions in voltage level are indicated as occurring instantaneously. In fact, however, because of bandwidth limitations in the circuitry that generates the waveforms and in the transmission lines over which they are propagated, each transition occurs over a finite time interval.

In order to provide uniformity in sensing the timing of each transition, the occurrence of the transition is usually defined as the midpoint between the starting and ending points of the transition. The midpoint, in turn, can be sensed by means of a zero-crossing detector, but only for those transitions for which the zero axis is the midpoint. In FIG. 1 only the transitions indicated at 12 and 14 have this characteristic. The remaining transitions either do not cross the zero axis or cross it but are asymmetrical with respect to the axis. Indeed, the consecutive symbols indicated at 16 and 18 have the same voltage level and thus have no intervening voltage transition.

Thus prior systems which are based on the sensing of zero axis crossings may, because of the intervals often encountered between usable crossings, miss high-frequency phase jitter components which are covered by the applicable standards. It will be apparent that with the signal sequence depicted in FIG. 1, and given a data rate of 80,000 symbols/second, high-frequency phase jitter components will not be detected if only symmetrical zero axis crossings are used for measurement of the timing of signal transitions.

On the other hand, with our invention, which uses the occurrence of the maximum absolute value of the slope, i.e. rate of change of signal voltage, as the indication of the midpoint of each transition, every transition can be used for the measurement of transition timing. The resulting determination of the timing of a transition provides a single sample of the phase jitter. For any frequency component in the phase jitter, the system must obtain enough jitter samples to ascertain the magnitude of that component with a reasonable degree of accuracy. In the high frequency portion of the measurement range, e.g. from 2,000 Hz to 20 kHz, 500 samples of the phase jitter will provide an accurate characterization of the magnitude of the jitter components at the frequencies involved. At the low frequency end of the spectrum, i.e. 0.15 Hz, jitter samples taken over approximately a single cycle of that component will accurately characterize the magnitude of the jitter. However, with the sampling rate provided for the high-frequency components, there will be an inordinately large number of samples, with corresponding demands on memory capacity and computation time.

We therefore sample the data signal in accordance with a burst arrangement. As shown in FIG. 2, sampling of the data signal is performed in bursts 30 separated by skip intervals indicated at 32. The bursts and skip intervals are synchronized to a local clock and the total length of a sample burst, plus a delay period is an integral number of symbols. The number of samples in each burst is sufficient to encompass multiple symbols increases the likelihood that at least one signal transition will occur during each burst. In each burst, the timing of the transition having the greatest absolute slope is selected as a jitter sample.

The burst length and the length of the skip interval depend on the range of jitter frequencies involved in the measurement. For measurement of the higher frequency components of the phase jitter a relatively short or even zero-length skip interval is required in order to provide a sufficiently high sampling rate for the phase jitter. On the other hand, at low frequencies, where the sampling rate is not an imposing limitation, we use a relatively long skip interval to conserve system resources as noted above. Specifically we have found that the jitter-frequency spectrum of 0.15 Hz to 20 KHz can be divided into four ranges, each having a different skip interval. These burst and the sampling sequences relating thereto are set forth in FIG. 6, assuming a symbol rate of 80,000/sec in the monitored signal and a sampling rate of 64 samples/symbol. For example, over the jitter frequency range 0.5–39 Hz we use a burst length of 128 samples, or two symbols, and a skip interval of 1022 symbols. This provides a jitter sample rate of 78.125, slightly in excess of the minimum sampling rate for the upper level of the frequency range. A total of 512 sampling bursts, i.e. jitter samples, are used for this measurement.

Similar measurement parameters are provided in FIG. 6 for three further jitter frequency ranges extending to 20 kHz. In the uppermost range, 78 Hz to 20 kHz, the skip intervals is zero and each sampling burst thus immediately succeeds the preceding burst.

B. BRIEF DESCRIPTION OF THE DRAWINGS

For a fuller understanding of the nature of the invention, reference should be had to the following detailed description taken in connection with the accompanying drawings, in which:

FIG. 4 illustrates a waveform of the time derivative of a monitored signal and the application of the invention to the waveform by the signal analysis unit to ascertain the timing of transition in the monitored signal;

FIG. 5 is a waveform of the phase of the monitored signal as measured by the signal analysis unit;

FIG. 6 is a chart of the signal-sampling sampling sequences for the various frequency ranges in the jitter spectrum.

C. DETAILED DESCRIPTION OF THE INVENTION

Figure 1:
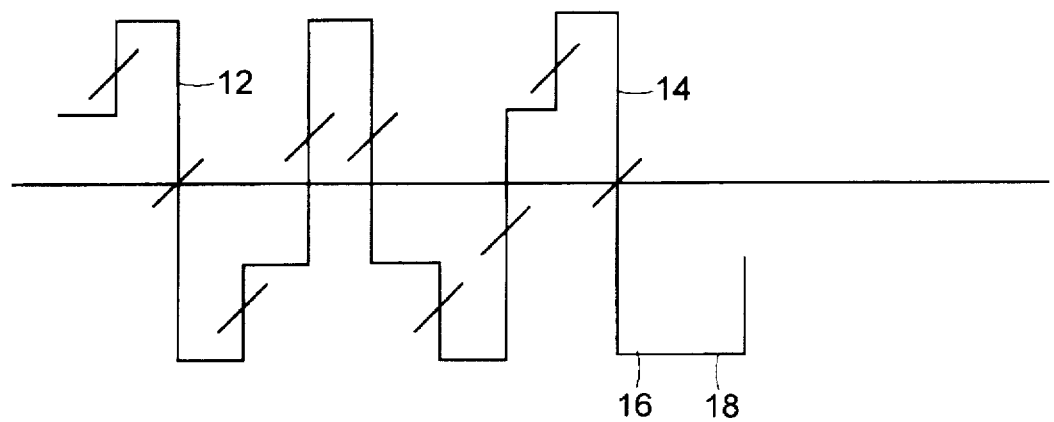
FIG. 1 depicts an idealized signal waveform in the 2B1Q format.
Figure 2:
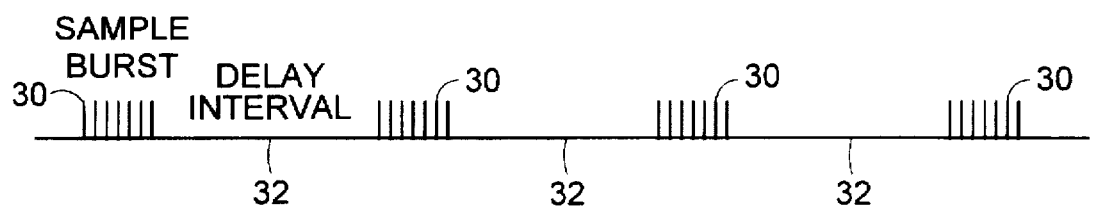
FIG. 2 depicts a succession of sampling bursts used in sampling signals in accordance with the invention.
Figure 3A:
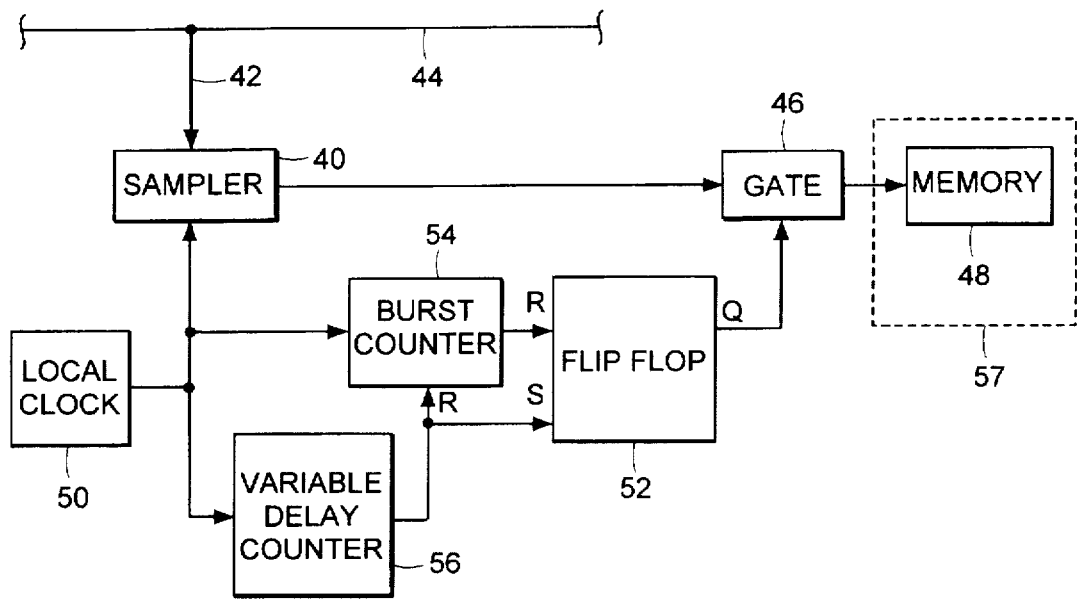
FIG. 3A is a block diagram of a signal sampling unit incorporated in a jitter-measuring system embodying the invention.

With reference to FIG. 3A, a sampler 40 which is connected to a tap 42 on a transmission line 44 provides a sequence of digital representations of the instantaneous signal voltage levels on the line. These digital signals are passed by a gate 46 to a random access memory 48 where they are accumulated for subsequent processing as described below. Operation of the sampler 40 is timed by the output of a local clock 50. The clock 50 is highly stable and has an output frequency as close as is practicable to an integral multiple of the symbol rate $f_0$ of the signals transmitted over the line 44. We have found that a multiple of 64 provides the desired resolution in sampling of the monitored signals when the interpolation arrangement described herein is used. The gate 46 is controlled by the output of a flip-flop 52 whose state is controlled by the outputs of a burst counter 54 and a skip counter 56, both of which count the output pulses of the clock 50.

The burst counter 54 has a capacity corresponding to a time length corresponding to multiple symbols in the monitored signal. It is adjustable to provide for different burst lengths according to the jitter frequency range involved in the measurement, as described above. The adjustments of the skip counter 56 are limited to counter capacities corresponding to integral numbers of symbols, i.e. integral multiples of 64 samples. Overflow of the counter 56 sets the flip-flop 52 so that its output enables the gate 46 and at the same time resets the counter 54. The gate 46 thereupon passes samples from the sampler 40 to the memory 48 until the counter 54 reaches its maximum count, at which point the counter 54 output resets the flip-flop 52, thereby disabling the gate 46.

As pointed out above, the burst of samples passed by the gate 46 during each of these cycles of the counters 54 and 56 ultimately provides one sample of the timing of the monitored signal. A sufficient number of bursts are passed to provide the requisite number of samples for a selected frequency range of the phase jitter in the monitored signal.

The capacities of the burst counter 54 and the skip counter 56 are thus changed to provide different burst lengths and timings between the bursts (i.e. skip intervals) and thereby provide for measurement of the phase jitter components in the respective frequency ranges. At the highest frequency range the capacity of the counter 56 is equal to that of the counter 54 so that continuous bursts of samples are fed to the memory 48.

It will be apparent that the gate 46, counters 54 and 56 and flip-flop 52 can be implemented in hardware or their functions can be provided by a digital computer 57 of which the memory 48 is a component.

Figure 3B:
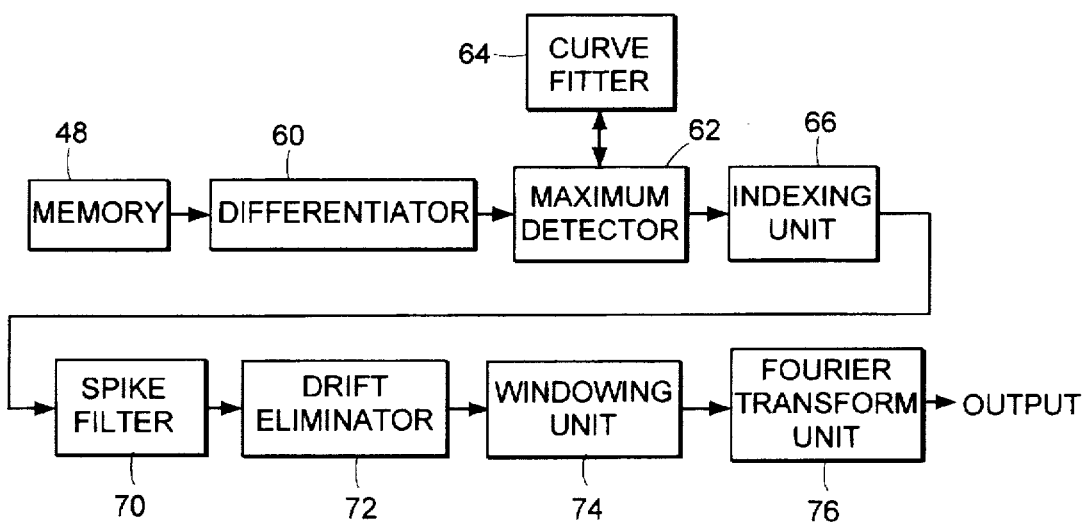
FIG. 3B is a block diagram of a signal analysis unit incorporated in the jitter-measuring system.

After the samples for a measurement have been accumulated in the memory 48, the computer 57 executes a series of software routines to process the samples and thereby provide the desired phase jitter measurements. FIG. 3B illustrates these routines as blocks of a corresponding hardware diagram. Specifically the samples from each burst are applied to a differentiator 60 whose output is a series of samples of the time derivative of the monitored signal. The output of the differentiator 60 is applied to a maximum detector 62 which calculates the position of the absolute maximum slope of the signal during the burst.

More specifically, the differentiator 60 simply calculates the differences between the values of successive signal samples to provide the derivative samples, indicated at 80 (FIG. 4), that define a derivative curve 82. The maximum detector 62 then selects a primary reference point which is, in essence, a rough determination of an absolute maximum of the derivative curve 82.

To determine the position of each primary reference point, we prefer to use a moving "window", as indicated at 84 in FIG. 4, encompassing a number of samples, e.g. 7. The window 84 is moved through the sample set in each burst and the sample values in the window are summed. The primary reference point is the central sample in the window when the sum has a maximum (or minimum) value. This arrangement diminishes the effects of noise in selecting the primary reference point. For example, if the values of individual samples were to be used in selecting the primary reference point, the sample 80a would be selected, whereas the sample 80b, which is at the center of the window 84 at the depicted position of the window, is clearly closer to a maximum of the curve 82.

In general the primary reference point will not be the true position of a maximum of a derivative curve 82. For example, errors are caused by noise and by the spacing between adjacent signal samples. We therefore prefer to use a curve-fitter 64, which reduces this error. A quadratic curve is fitted to the primary reference point and to samples preceding and following that sample. The latter two samples may, for example, be spaced from the primary reference point by twelve sample intervals, as indicated at 86 and 88 in FIG. 4. These three samples 80b, 86 and 88, fix the coefficients of the quadratic expression.

The system derives the first two coefficients and uses them in differentiating the expression to find the position of the maximum. Thus, with the illustrated curve 82 and the maximum encompassed by the window 84, a quadratic curve 90 fits the samples 80b, 86 and 88. This curve has a maximum at 92, which is taken as a maximum of the derivative and thus the location, i.e. timing, of the signal transition involved in the calculation.

As an example of the advantages to be gained from the foregoing procedure, measurements were taken which provided the illustrated derivative curve 82. If the maximum sample value is taken as the point of the derivative maximum, i.e. the position of the sample 80a, there was an error of 32.6 degrees. The selection of the primary reference point 80b as the maximum reduced the error to 17.6 degrees. On the other hand, selection of the maximum point of the quadratic approximation, i.e. the position indicated at 92, reduced the error to 0.3 degrees.

As noted above, each burst of signal samples is of sufficient duration to encompass multiple transitions in the monitored signal. In an illustrative system the burst durations are as set forth in FIG. 6. Thus, when making a measurement in the jitter-frequency range 62 Hz to 8 kHz there will be four possible points in each burst where a signal transition having the absolute maximum slope in that burst may occur. To facilitate the development of a jitter waveform from the transition information provided by the maximum detector 62, the maxima in all the bursts must be referenced to the same position within the bursts. That is, with up to four possible transition positions in each burst, one of those positions is selected as a reference and the maxima that occur at or in the neighborhood of the other three positions are indexed to that position by adding or subtracting the nominal phase differences between those positions and the reference position.

Any one of the four transition positions can be selected as the reference position. However, since indexing of the positions to a common reference is a source of error, we prefer to select, as the reference, the position involving the greatest number of derivative maxima. Accordingly, after the maxima have been identified by the maximum detector 62, the system uses an indexing unit 66 to essentially calculate a histogram of the number of selected maxima in the neighborhood of each of the four nominal transition positions. It then selects as the reference position the position involving the greatest number of maxima and indexes all the other maxima to that burst position. A similar arrangement is followed in the frequency ranges in which two signal transitions are encompassed by each sample burst.

After they are indexed to a single burst position, the selected transitions define a curve of which the curve 100 in FIG. 5 is an example. This curve has a sinusoidal component and an overall slope. The sinusoidal component is a graphical representation of the phase jitter and the slope represents drift, mainly due to the difference in frequency between the clock 50 (FIG. 3A) and the clock (not shown) that is used in generating the monitored signal. The waveform may have some impulse noise as indicated by the samples 92a and 92b and it is therefore passed through a spike filter 70 (FIG. 3B) that will tend to smooth out high frequency spikes.

Also, in some cases a burst may contain a sequence of symbols that does not provide sufficiently good transitional information to select a maximum. In such cases a transition will be missing from the curve 100 as indicated, for example, at 102. A pseudo transition is then inserted by interpolation, preferably linear interpolation.

Next the drift is removed from the waveform 100 by a drift eliminator 72 (FIG. 3B). The drift eliminator calculates the slope of the ramp of the curve by first determining average values of the bursts in the first and last portions of the waveform, e.g. the first quarter and the last quarter. The difference between the two values is averaged over the number of bursts to give the average drift. Then an accumulated drift is subtracted from the waveform to "level" the waveform. The average value of the entire waveform is then calculated and also subtracted from the waveform, thereby leaving only the AC components, i.e. the jitter.

Returning to FIG. 3B, a Fourier transform can be applied to the resulting waveform to ascertain the frequencies and amplitudes of the various components in the waveform. Since the waveform has a finite length and since the measurement system is not coherent with the jitter frequencies, a transform at this juncture will generally produce spurious side lobes in the output. Accordingly, we prefer to pass the waveform through a windowing unit 74 which applies a cosine-bell window to the waveform to force the ends of the waveform to zero amplitude. The windowed waveform is then passed to a FFT-unit 76 which performs the Fourier transform to produce the output of the system.

The foregoing procedure is applied separately in the respective frequency bands as explained above. That is, for each band a different signal-sampling burst length and burst rate are used as set forth above. The invention thus provides a high degree of accuracy without resort to undue storage and processing time for determination of the low-frequency jitter components.

Figure 7:
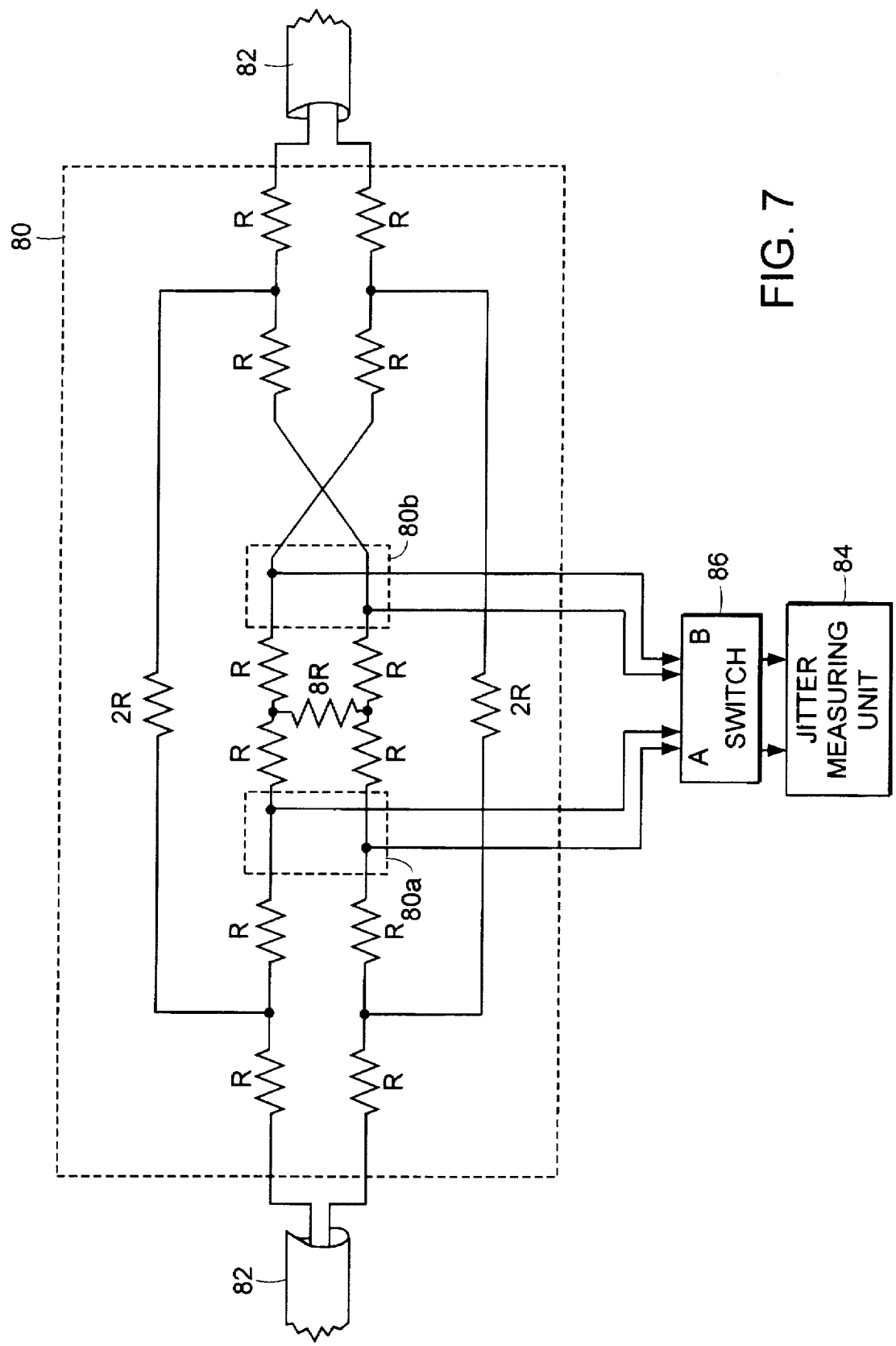
FIG. 7 is a diagram of a system for measuring phase jitter in signals passing in either direction over a transmission line.

In FIG. 7 we have illustrated a system for monitoring phase jitter of signals propagating in either direction over a transmission line having a characteristic impedance R. A directional coupler indicated generally at 80 is inserted in the transmission line. The illustrated coupler 80 is a resistive network configured as shown, with the individual resistors preferably having the resistance values shown so as to match the transmission impedance. The coupler also has a pair of sampling ports 80a and 80b, which, respectively, provide replicas of the signals propagating in opposite directions on the transmission line 82.

A jitter measuring unit 84, of the type illustrated in FIGS. 3A and 3B, is selectively connected to the ports 80a and 80b, for example, by a switch 86. Thus, connecting the switch 86 first in one position and then the other position, one may monitor the phase jitter in signals propagating in one direction over the line 82 and then in signals propagating in the opposite direction.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A jitter measuring system for measuring phase jitter of the transitions in a multiple-level digital signal, the system comprising:
   A. a local clock,
   B. sampling means for sampling the signal in synchronism with the local clock at a rate substantially greater than the symbol rate in the signal, thereby to provide a series of digital signal samples, each of which represents a value of the signal,
   C. derivative means for
      1) processing the signal samples to obtain a series of samples of the time derivative of signal, and
      2) processing the derivative samples to provide a series of values of the timing of absolute maxima of the derivative, the timing values being samples of the waveform of the phase jitter.

2. The system defined in claim 1 in which the sampling means samples the signal in spaced-apart bursts, and wherein the timing values are samples of the low-frequency components of the phase jitter.

3. The system defined in claim 1 in which the sampling means samples the signal in consecutive sets of bursts, each set having a different burst rate, whereby the timing values obtained from the respective burst sets are samples of different ranges of frequency components of the phase jitter.

4. The system defined in claim 3 in which the derivate means includes:
   A. means for identifying for each burst the derivative sample closest to the absolute maximum slope of the signal, and
   B. means for fitting a quadratic curve to a set of samples including the closest sample and calculating the timing of the maximum of the curve to provide a sample of the jitter waveform.

5. The system defined in claim 3 in which the derivative means
   A. passes a multiple-sample window along the series of samples of the time derivative in each burst,
   B. ascertains the position of the window when the sum of the values of the samples contained therein corresponds with an absolute maximum value of the time derivative, and
   C. selects the central sample in the window at that position as a primary reference point of the absolute maximum.

6. The system defined in claim 5 further including means for
   A. fitting a quadratic curve to a set of samples including the primary reference point and a pair of samples preceding and following the primary reference point, and
   B. calculating the maximum of the curve provide a sample of the jitter waveform.

7. The system defined in claim 1 including transform means for generating a Fourier transform of the curve represented by the timing values, thereby to provide a spectrum of the phase jitter.

8. The system defined in claim 7 in which the transform means includes:
   means for processing the jitter waveform samples to remove therefrom any variation in the timing values due to a frequency difference between the signal transitions and the local clock.

9. The system defined in claim 1 including:
   A. a directional coupler connected in a transmission path of digital signals whose phase jitter is to be measured, the directional coupler having a pair of output ports providing replicas of the signals passing in the respective directions in the transmission path, and
   B. means for connecting the sampling means alternatively to the first and second output ports, thereby to selectively measure the phase jitter and the signals passing in the respective directions.

10. A jitter measuring system for measuring phase jitter of the transitions in a multiple-digital signal, said system comprising a:
   A. local clock;
   B. sampling means for sampling the signal in synchronism with the local clock at a rate substantially greater than the symbol rate in the signal, thereby to provide a series of digital signal samples, each of which represents a value of the signal, the sampling means sampling the signal in bursts, each of which encompasses multiple transitions of the signal;
   C. derivative means for:
      1. processing the signal samples to obtain a series of samples of the time derivative of the signal; and
      2. processing of derivative samples to provide a series of timing values, each of which represents the timing of the absolute maximum of the derivative in a burst, the timing values being samples of the waveform of the phase jitter.

11. The system defined in claim 10 in which the derivative means:
   A. passes a multiple-sample window along the series of samples of the time derivative in each burst,
   B. ascertains the position of the window when the sum of the values of the samples contained therein corresponds with an absolute maximum value of the time derivative, and
   C. selects the central sample in the window at that position as a primary reference point of the absolute maximum.

12. A system defined in claim 11 further including means for:

A. fitting a quadratic curve to a set of samples including the primary reference point and a pair of samples preceding and following the primary reference point, and B. calculating the maximum of the curve to provide a sample of the jitter waveform.

13. A method of measuring phase jitter of the transitions in a digital signal, the method comprising the steps of:

A. sampling the signal at a rate substantially greater than the symbol rate in the signal to provide a series of digital signal samples, each of which represents a value of the signal, B. obtaining from the signal samples a series of samples of the time derivative of the signal, and C. processing the derivative samples to provide a series of timing values representing the timing of absolute maxima of the derivative samples, the timing values being samples of the waveform of the phase jitter.

14. The method defined in claim 13 in which:

A. the signal is sampled in bursts, each of which encompasses multiple transitions of the digital signal, and B. in the processing step, the absolute maximum of the derivative samples in each burst is ascertained to provide a sample of the waveform of the phase jitter.

15. The system defined in claim 14 in which the digital signal is sampled in sets of bursts, each set having a different burst rate, whereby the timing values obtained from the respective sets of bursts are samples of different ranges of frequency components of the phase jitter.

* * * * *

UNITED STATES PATENT AND TRADEMARK OFFICE
CERTIFICATE OF CORRECTION

PATENT NO. : 5,748,672
DATED : May 5, 1998
INVENTOR(S) : Marc L. Smith, et al.

It is certified that error appears in the above-identified patent and that said Letters Patent is hereby corrected as shown below:

On the title page, item [73] Assignee, should read—GenRad, Inc., Conord, MA--.

Signed and Sealed this

Twenty-fifth Day of August, 1998

*Attest:*

BRUCE LEHMAN

*Attesting Officer*   *Commissioner of Patents and Trademarks*